United States Patent
Kawada

[15] 3,699,657
[45] Oct. 24, 1972

[54] GYROSCOPIC INSTRUMENT

[72] Inventor: Shin-ichi Kawada, Yokohama, Japan

[73] Assignee: Kabushikikaisha Tokyo Keiki Seizosho (Tokyo Keiki Seizosho Co., Ltd.), Tokyo, Japan

[22] Filed: Aug. 3, 1970

[21] Appl. No.: 60,282

Related U.S. Application Data

[62] Division of Ser. No. 695,127, Jan. 2, 1968, Pat. No. 3,596,366.

[30] Foreign Application Priority Data

Jan. 13, 1967  Japan ..................... 42/2649

[52] U.S. Cl. .................................. 33/324, 33/327
[51] Int. Cl. ................................... G01c 19/40
[58] Field of Search ....33/226 R, 226 B; 74/5.34, 5.5

[56] References Cited

UNITED STATES PATENTS

| | | |
|---|---|---|
| 1,380,336 | 5/1921 | Paxton ........................ 33/226 |
| 2,700,829 | 2/1955 | Statsinger ..................... 33/226 |
| 2,729,107 | 1/1956 | Braddon ....................... 74/5.34 |
| 2,887,783 | 5/1959 | Blizard ........................ 33/204 X |
| 2,968,953 | 1/1961 | Agins .......................... 74/5.5 X |
| 3,443,320 | 5/1969 | Boltinghouse et al. ....... 33/226 |

FOREIGN PATENTS OR APPLICATIONS

| | | |
|---|---|---|
| 929,326 | 6/1955 | Germany ..................... 33/226 |
| 247,265 | 2/1926 | Great Britain ............... 33/226 |

Primary Examiner—Robert B. Hull
Attorney—Hill, Sherman, Meroni, Gross and Simpson

[57] ABSTRACT

A gyroscopic instrument having a gyro case including a gyro therein and supported with three degrees of freedom and means for applying a control torque to the gyro about a substantially horizontal axis across the gyro-spin axis at right angles thereto in response to a differentiated value of the inclination of the gyro-spin axis.

4 Claims, 7 Drawing Figures

Fig. 1

INVENTOR
SHIN-ICHI KAWADA

GYROSCOPIC INSTRUMENT

CROSS-REFERENCE TO RELATED APPLICATIONS

This application is a division of my co-pending application filed Jan. 2, 1968 under Ser. No. 695,127, now Pat. No. 3,596,366.

BACKGROUND OF THE INVENTION

1. Field of the Invention

This invention relates to a gyroscopic instrument for use with ships, airplanes and the like.

2. Description of the Prior Art

In prior art an inertial navigation system has been proposed for use with ships, airplanes and the like for detecting and indicating their location, namely azimuth and latitude thereof. However, this conventional system necessitates the use of at least two gyros, two accelerometers, a computer, etc., and hence encounters some problems such as expensiveness, complexity in construction and in operation, which impose a severe limitation on wide use of the conventional system at the present stage of the art.

SUMMARY OF THE INVENTION

The primary object of this invention is to provide an inexpensive, simply-structured, easy-to-handle and high precision gyroscopic instrument which employs only one gyro but is capable of continuous detection and indication of the azimuth and the latitude on ships, airplanes and the like.

Other objects, features and advantages of this invention will become apparent from the following description taken in conjunction with the accompanying drawings. BRIEF DESCRIPTION OF THE DRAWINGS

In FIG. 1 illustrating the principle of this invention, reference numeral 4 indicates a gyro case having incorporated therein a gyro (not shown), which case is mounted on a support base 10 by means described later. The gyro is positioned in the gyro case 4 at its center 0 concentrically therewith and is driven at high speed. The vector of the angular momentum of the gyro is indicated by an arrow H. Let it be assumed in this case that the gyro rotates in such a manner that a right hand screw is driven from the center 0 in the direction indicated by the arrow H. The gyro case 4 has attached thereto shafts 5 and 5' crossing the spin axis of the gyro at right angles thereto, and free ends of the shafts 5 and 5' are supported by a vertical ring 6 to permit rotation of the gyro case 4 about the axis of the shafts 5 and 5'. It is to be realized that in this specification the reference to ring 6 being vertical refers to the analogy with leveled gyros. The shafts 5 and 5' are tilted with ring 6. The ring 6 in its settled condition has its central axis parallel to the axis of the earth.

Figure 1:
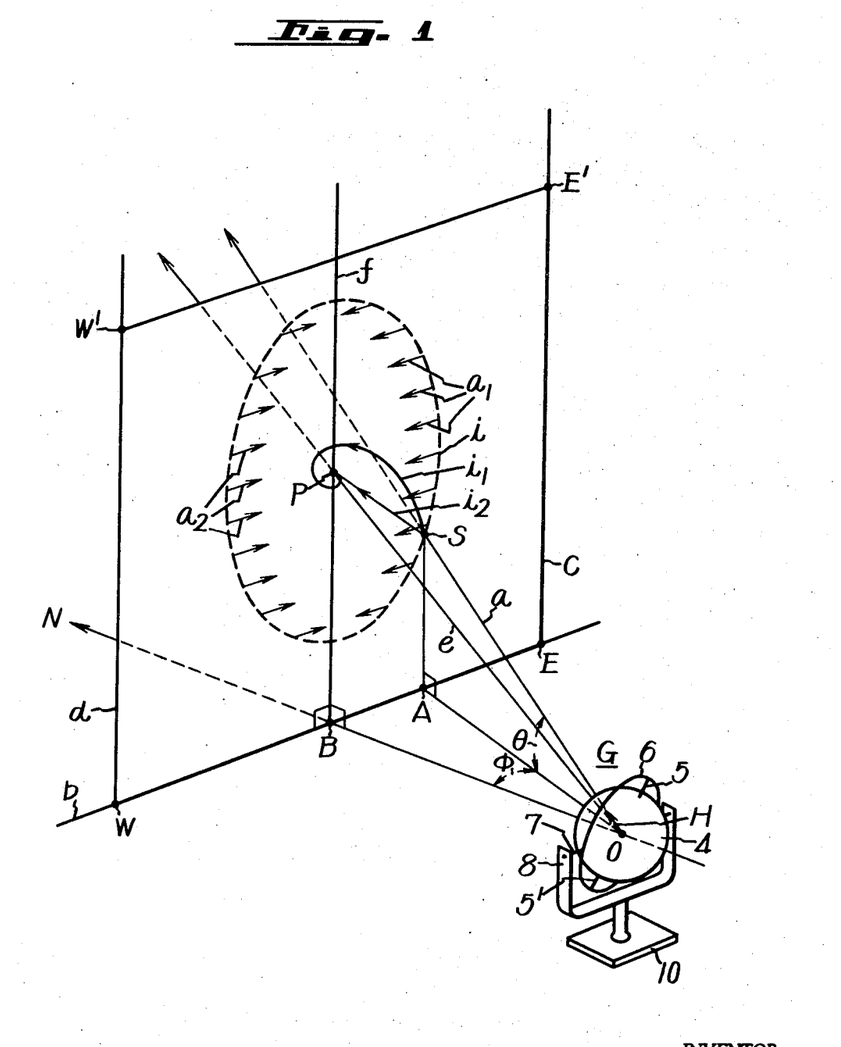
FIG. 1 is a schematic diagram for explaining the principles of this invention.

The vertical ring 6 has horizontal shafts 7 and 7' perpendicular to the shafts 5 and 5' the shafts 7 and 7' being supported at one end by an outer ring 8, (which is shown in a substantially U-shaped configuration in FIG. 1). In this case, the vertical ring 6 is freely rotatable about the shafts 7 and 7' relative to the outer ring 8, which is, in turn, mounted on the support base 10 directly or through any support member.

Such an instrument as described above might be generally called a three-degree-of-freedom gyroscope G, if no friction should be yielded about the shafts 5 and 5', 7 and 7'. Unless applied a torque from the outside, it is in neutral equilibrium and its angular momentum remains constant and the direction of the gyro-spin axis, that is, the direction of the vector H of the angular momentum in FIG. 1 is invariable relative to absolute space in accordance with Newton's law of conservation of angular momentum. Now, a straight line is drawn from the center 0 of the gyro in the direction of the arrow H, which is identified at reference character a. Another straight line ON is drawn through the center O of the gyro in a horizontal plane in parallel relation to the meridian, and a desired point B is taken in the line ON two points E and W are taken in a straight line b which intersects with the line ON at right angles thereto at the point B in the horizontal plane. In addition, straight lines c and d are respectively drawn upward from the points E and W in a vertical direction and points E' and W' are taken in the straight lines c and d in such a manner that a segment E' W' joining the two points may be parallel with EW. The point at which the straight line a crosses a plane EWE'W' thus obtained is identified by S. Further, a perpendicular is drawn from the point S to the segment EW and its foot is denoted A. As depicted in the figure, an angle defined by the segment 0A joining the center O of the gyro case 4 and the point A and the segment OS is referred to as $\theta$, while an angle defined by a segment OB joining the center O of the gyro case 4 and the point B on the straight line ON and the segment OA is referred to as $\Phi$. In such a case, if the place where the gyro is located is not of high latitude, the aforementioned point S travels on the plane EWW'E' as indicated by the dotted line i with the lapse of time for the following reason. That is, the segment OS agrees with the direction of the gyro-spin axis and hence is invariable relative to absolute space, while the plane EWW'E' is fixed on the earth and hence rotates with the earth. This causes such a circular movement of the point S as indicated by the dotted line i. If now a straight line e is drawn from the center O of the gyro case 4 in parallel relation to the axis of the earth's rotation and its intersecting point with the plane EWW'E' is denoted P, the point P naturally lies in a straight line $f$ which is perpendicular at B to the straight line EW on the plane EWW'E' and an angle BOP agrees with the latitude of the place where the gyro is situated. As mentioned above, the direction of the segment OS is in agreement with that of the gyro-spin axis and hence is invariable with respect to absolute space. While, if the plane EWW'E' is on the earth, it shifts with the rotation of the earth with respect to absolute space. Therefore, the segment OS performs conical motion about the point O, and accordingly the locus of the point S on the plane EWW'E' forms an ellipse. In this case the point S moves about the point P while maintaining the angle SOP constant, and the period of the circular motion of the point S is approximately 24 hours. The locus of the point S is indicated by the dotted line $i$.

In the above-described system the use of a device capable of controlling the gyro continuously to hold the point S at the point P could provide continuous and accurate detection of the latitude and the direction of the meridian at any desired place on the earth's surface by measuring the angle POB and the direction of the segment OB.

The present invention resides in the concept of simultaneous measurement of true north and latitude through the use of a single gyro by utilizing the property of the gyro and in the development of the techniques for embodiment of the concept.

A description will hereinbelow be given of the concept on which this invention is based. This invention is to control the gyro in a manner quite different from that of the conventional gyrocompasses, as will be described later, based upon the fact that while the point S is biased further to the east (in the direction of the segment EE' in FIG. 1) than the straight line $f$, the angle $\theta$ continues to increase and while the point S is biased further to the west (in the direction of the segment WW') than the line f the angle $\theta$ goes on decreasing. The control operations for the gyro in this invention include one, detecting a differentiated value $\theta$ of the angle $\theta$ (or the rate of $\theta$), and two, applying a torque substantially proportional to the differentiated value $\theta$ to the gyro about the horizontal axis thereof, that is, about the shafts 7 and 7'. In this case, while the differentiated value $\theta$ is positive, that is, while the angle $\theta$ increases, the control torque is applied to the gyro about the shafts 7 and 7' in such a direction that the gyro-spin axis precesses to cause a decrease in Φ that is, in the angle BOA. While the differentiated value $\theta$ is negative, the angle $\theta$ decreases, the control torque is applied to the gyro in such a direction that the gyro-spin axis precesses in a direction opposite to the above-mentioned one. Now the above operations will be described more in detail. In the first place, the differentiated value $\theta$ of the angle $\theta$ is detected and while $\theta$ remains positive, the point S lies further to the east than the line f, as will be apparent from the foregoing. In this case, if a torque of such a direction that a right hand screw is driven from the point 0 in the direction of the shaft 7, is applied to the gyro about its horizontal shafts 7 and 7', the precession caused in the gyro tends to direct the point S to the straight line $f$, that is, in a direction indicated by arrows $a_1$ in FIG. 1. As a result of this, the point S does not move on its locus indicated by the dotted line $i$ which is formed when the gyro is not controlled, and instead the point S draws a locus more direct toward the line $f$. That is, the point S moves on a locus such as indicated $i_1$. Further, when the point S passes across the line f it is to turn about the point P while at the same time descending under the influence of the rotation of the earth. However, simultaneously with the descent of the point S, a torque substantially proportional to the differentiated value $\theta$ begins to act about the horizontal shafts 7 and 7' in such a direction that a right hand screw is driven from the shaft 7 in the direction of the point 0. This produces precession in the gyro, by which the point S is caused to approach again the line f in a direction indicated by arrows $a_2$ in FIG. 1. Where the gyro is not constrained, the point S accomplishes non-attenuated periodic motion, that is, periodically moves on the dotted line $i$. In the present invention a torque substantially proportional to the differentiated value $\theta$ is applied to the gyro about its horizontal shafts 7 and 7' in the aforementioned direction, as above described, so that the point S finally comes to agree with the point P following the spiral locus $i_1$ of the attenuated periodic motion. If the torque is substantially or exactly proportional to $\theta$ the attenuated periodic motion becomes gradually non-oscillatory and finally becomes as indicated by a full line $i_2$, so that the point S may reach the point P in a substantially straight line. Thus, even if periodic motion having a period of 24 hours is initiated with the point S selected at any desired point, the point S can be brought to the point P within several hours.

With the gyro of this system, the latitude and the meridian can be simultaneously detected and indicated by the angle POB and the straight line OB respectively.

Figure 2:
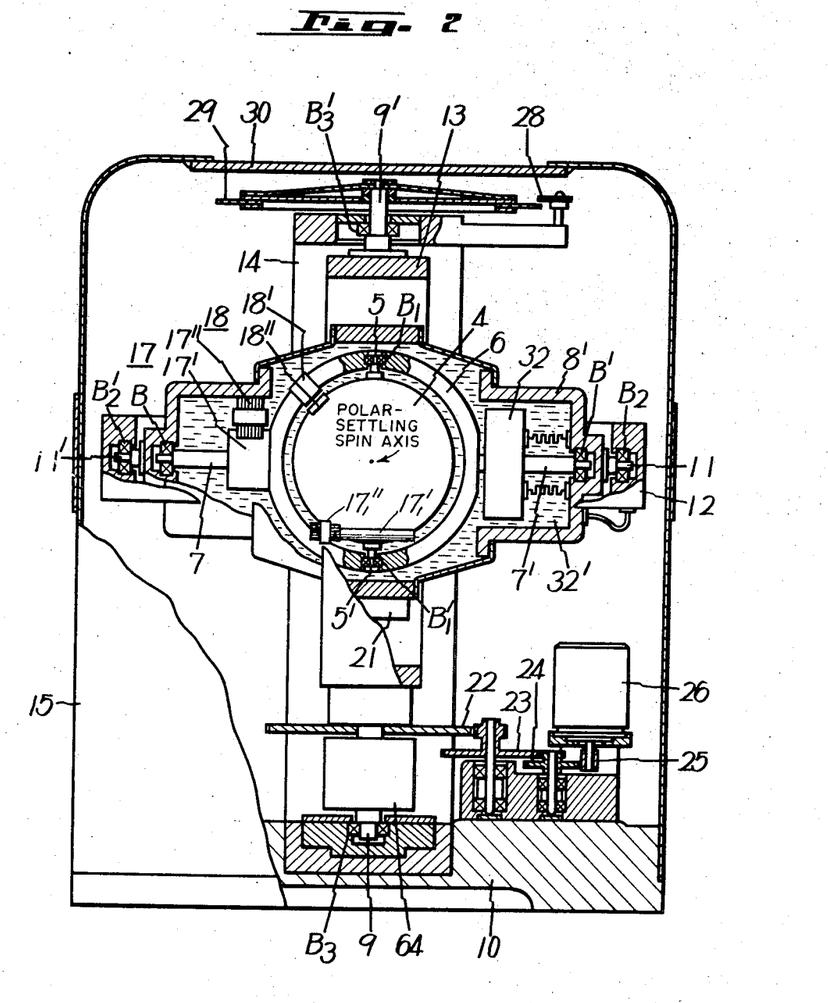
FIG. 2 is a side view schematically illustrating one example of a gyroscopic instrument produced according to this invention, having one portion removed.

A description will hereinafter be made in connection with one example of an instrument embodying the principles of this invention. In FIG. 2 there is illustrated, partly in cross-section, one embodiment of this invention. A container 8' has incorporated therein a vertical ring 6 having horizontal shafts 7 and 7', which are supported on the container 8' through ball bearings B and B'. The vertical ring 6 has supported therein by ball bearings $B_1$ and $B_1'$ a spherical gyro case 4 having vertical shafts 5 and 5'. The gyro case 4 has housed therein a gyro (not shown) which is driven at high speed as in FIG. 1, and in FIG. 2 the gyrospin axis is normal to the plane of the paper. FIG. 2 illustrates an example in which the vertical shafts 5 and 5' are vertical.

The container 8' has projected outside thereof shafts 11 and 11' coaxially with the horizontal shafts 7 and 7', and the shafts 11 and 11' are supported by a horizontal ring 12 by means of ball bearings $B_2$ and $B_2'$. The horizontal ring 12 has attached thereto shafts 31 and 31' (not shown) at right angles to the shafts 11 and 11' and normal to the sheet, which shafts 31 and 31' are, in turn, supported by a follower ring 13 by means of ball bearings (not shown). The follower ring 13 has secured thereto at upper and lower portions shafts 9 and 9', which are attached to a support 14 through ball bearings $B_3$ and $B_3'$, so that the follower ring 13 is supported by the support 14. The support 14 is fixed on a support base 10 on which a binnacle 15 is mounted. At the top of the binnacle 15 there is formed a window into which a glass 30 is fitted. Further, the shaft 9' has mounted thereon a compass card 29 by suitable means, and a pointer 28 is fixedly mounted on the support 14 in such a manner that an azimuth scale on the compass card 29 can be read out relative to the pointer 28. In addition, an azimuth gear 22 is secured to the follower ring 13 near its lower end, which gear constitutes a gear train together with gears 23 and 24 and a pinion 25. The gear train is rotated by a servo motor 26 having the pinion 25. A weight 21 is attached to the container 8' at its lower portion to ensure that even if, for example, a ship equipped with the present instrument lists, the container 8' does not turn over and is controlled by the degree of freedom of the shafts 11, 11', 31 and 31' so that the weight 21 is always directed downwards due to gravity acting thereon.

The container 8' is filled with a liquid 32' such as transformer oil or the like and the gyro case 4 is designed so that its specific gravity is substantially equal to that of the liquid 32'. This ensures that the shafts 5 and 5' do not render any load to the ball bearings supporting them, and consequently friction of the bearings can be regarded as negligibly small in practice. Further, the entire specific gravity of the vertical ring 6 and the horizontal shafts 7 and 7' formed integrally therewith can also be selected exactly or nearly equal to that of the liquid 32, by which friction of the ball bearings supporting the shafts 7 and 7' can also be reduced to a small value.

The relative angular deviation between the gyro case 4 and the vertical ring 6 is detected by means of a deviation detector 18 which consists of deviation detector elements 18' and 18" cooperating with each other, the former being mounted on the vertical ring 6 and the latter on the gyro case 4 at a position corresponding to the former. The deviation detector 18 may be in the form, for example, of a differential transformer, which is suitable for use in this case. An electrical signal proportional to a diviation between the gyro case 4 and the vertical ring 6, detected by the deviation detector 18, is fed through an amplifier (not shown) to a servo motor 26 to rotate it. The rotation of the servo motor 26 is transmitted through the gears 25, 24, 23 and 22 to the follower ring 13 to drive it about the shafts 9 and 9'. This rotates the vertical ring 6 about the shafts 5 and 5' through the shafts 31 and 31', the horizontal ring 12, the shafts 11 and 11', the container 8' and the shafts 7 and 7' to control the vertical ring 6 in such a manner as to be always in agreement with the gyro case 4 without producing any relative deviation therebetween. That is, the relative deviation detector 18, the amplifier, the servo motor 26, the gear train 25, 24, 23 and 22, the support rings 13, 12, and the container 8' and the vertical ring 6 constitute one servo system. With such an arrangement, the shafts 5 and 5', the horizontal shafts 7 and 7' and the gyro-spin axis always intersect at right angles to one another, providing the gyro with three degrees of freedom. At the same time, the azimuth of the gyro can be read out from the compass card 29 mounted on the shaft 9' relative to the pointer 28 secured to the support 14.

Meanwhile, a rotor 17' is fixedly mounted on the shaft 7 and a stator 17" is disposed on the container 8', which rotor and stator interact in a manner to constitute a torquer 17. The torquer 17 serves to apply to the gyro about the shafts 7 and 7' a torque in proportion to the aforementioned differentiated value $\theta$, and in practice any type of conventional torquer may be employed in this invention. The torquer 17 exemplified in FIG. 2, is an induction-type torquer in which the rotor 17' is a metal cylinder and the stator 17" is an E-shaped laminated core with windings wound on its three legs.

Figure 3:
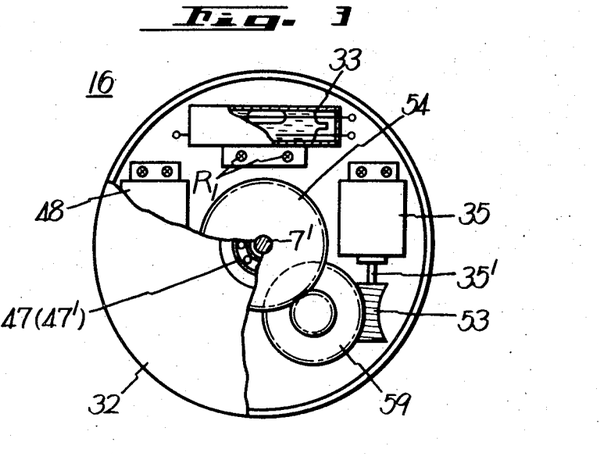
FIG. 3 is a side view schematically illustrating, by way of example, a gyro control signal generator unit and a latitude signal generator unit employed in the gyroscopic instrument of this invention, similarly with one portion removed.
Figure 4:
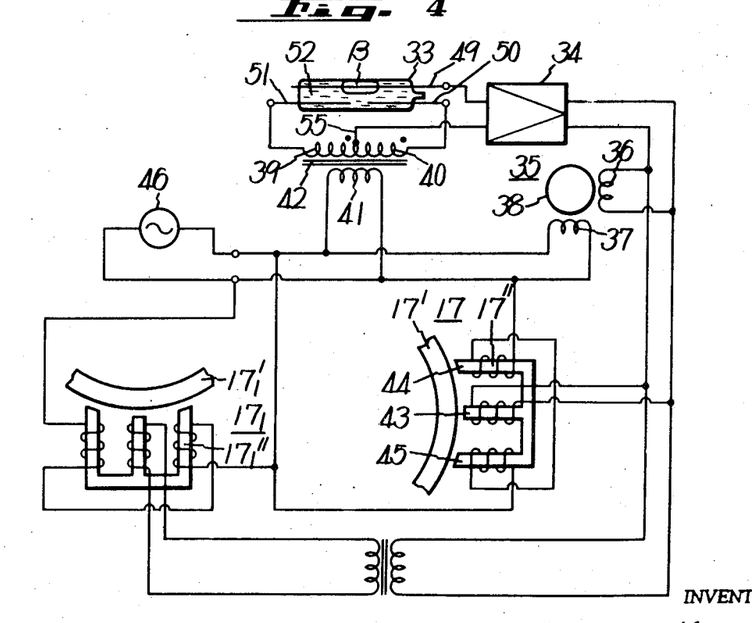
FIG. 4 is a connection diagram illustrating electrical connections between a power source and other elements of the gyroscopic instrument of this invention.

Reference numeral 16 indicates generally a device for effecting detection of $\theta$ necessary for the gyro control system of this invention and for detection of the latitude. In the illustrated example, the device 16 is shaped in a cylindrical configuration which has incorporated therein a servo motor, gears, a synchro generator and an electrolyte level and is mounted about the shaft 7'. Referring not to FIGS. 3 and 4, a description will be given of the construction of the device 16 and the torquer 17, prior to describing the operation of the instrument of this invention depicted in FIG. 2. FIG. 3 is a schematic diagram of the device 16 viewed from the axial direction of the shaft 7', in which a cylindrical case 32 of the device 16 is mounted about the shaft 7' by means of ball bearings 47 and 47' disposed centrally of end faces of the case 32. That is, the case 32 is rotatable about the shaft 7'. Further, a gravity reference such, for example, as an electrolyte level 33 is secured to the case 32 by means of, for example, bolts $R_1$, as illustrated, and a servo motor 35, a precision synchro generator 48 and an intermediate gear train 59 are respectively fixed to the case 32. The free end of a rotary shaft 35' of the servo motor 35 has mounted thereon a worm 53, which is, in turn, engaged with the intermediate gear train 59. The rotation of the servo motor 35 reduced by the gear train 59 is transmitted therethrough to a spur gear 54 mounted on the shaft 7'. Rotation of the rotary shaft 35' of the servo motor 35 leads to rotation of the case 32 about the shaft 7'. The synchro generator 48 is adapted so that its shaft is rotated by a gear engaged with the spur gear 54 or by a gear engaged with the gear train consisting of the worm 53, the intermediate gear 59 and the spur gear 54. In FIG. 4 there is depicted a connection diagram of the gyroscopic instrument of this invention exemplified in FIGS. 2 and 3. In other words, FIG. 4 is a connection diagram for the purpose of describing the operation of the electrolyte level 33, the servo motor 35, and the torquer 17. These elements will hereinbelow be described in detail. The electrolyte level 33 is such that an electrolyte 52 is enclosed in a sealed glass vessel having a similar curvature to that of a conventional spirit level and a bubble $\beta$ is formed in the vessel, as depicted in the FIGURE, and electrodes 49, 50 and 51 are disposed in the sealed glass vessel. Reference numeral 42 designates a transformer consisting of a primary winding 41 and two secondary windings 39 and 40. The primary winding 41 is connected to an A. C. power source 46, so that A. C. currents of low voltage of the same value are applied from the secondary windings 39 and 40 to the electrodes 50 and 51 of the electrolyte level 33. The polarities of the two secondary windings 39 and 40 are determined as indicated by dots in the figure. Where the electrolyte level 33 is horizontal and accordingly the bubble $\beta$ rests at the center of the vessel (at a neutral position), the electrical resistance values of the electrolyte present between the electrodes 49 and 50 and between the electrodes 49 and 51 are equal to each other, so that no voltage is produced between a terminal 55 and the electrode 49. When the electrolyte level 33 is inclined and consequently the bubble β shifts from the center of the vessel, there is produced a difference in the electrical resistance values of the electrolyte between the electrodes 49 and 50 and between the electrodes 49 and 51. This produces a voltage between the terminal 55 and the electrode 49, which voltage is amplified by an amplifier 34 and shifted about 90° in phase, thereafter being applied to a control winding 36 of the servo motor 35. An energizing winding 37 of the servo motor 35 is energized by the A. C. power source 46 and the servo motor 35 is a two-phase induction motor in principle, so that application of the aforementioned control voltage to the control winding 36 leads to rotation of the servo motor 35.

Assume that the gyro case 4 is pointing to the point S as depicted in FIG. 1 and the electrolyte level 33 is horizontal. Thereafter, the gyro changes its position along the dotted line i of FIG. 1 due to the rotation of the earth, with the result that the angle $\theta$ in FIG. 1 gradually increases. The change produces rotation of the vertical ring 6 with an about the axis of shafts 7 and 7', while the shaft 7' and the case 32 are engaged by the worm 53 and hence are initially rotated together. As a result of this, the electrolyte level 33 gradually inclines with an increase in the angle $\theta$. This inclination is detected in the form of movement of the bubble β, and consequently an A. C. signal is produced between the terminal 55 and the electrode 49 as described above, which signal is fed through the amplifier 34 to the control winding 36 of the servo motor 35. With the feeding of the signal to the control winding 36, the servo motor 35 begins to rotate to drive the case 32 relative to shaft 7' in a manner to hold the electrolyte level in a horizontal position, thus maintaining the device 16 substantially invariable relative to the earth. That is, the device 16 is a servo system by means of which the electrolyte level 33 is rotated about the shaft 7' in response to the change of the position of the gyro relative to the earth so as to ensure that the electrolyte level 33 is controlled to always lie in a horizontal position. Accordingly, the rotational speed of the servo motor 35 is in proportion to the differentiated value $\dot\theta$ of the angle $\theta$, and the rotational speed of the servo motor 35 is also substantially proportional to the voltage of the control phase, so that the output voltage of the amplifier 34 is also substantially proportional to the differentiated value $\dot\theta$. Briefly stated, when the position of the gyro changes relative to the earth and the angle $\theta$ varies correspondingly, if the rotational speed of the servo motor 35 is lower than an optimum speed, the difference between the position of the bubble β and its neutral position is naturally caused to gradually increase for the following reason. The rotation of the case 32 about the shaft 7' cannot follow the rotation of the shaft 7' because the speed of the servo motor is too low, with the result that the case 32 gradually inclines together with the gyro in a manner to cause an increase in the angle $\theta$. In this case, the bubble β goes away from its neutral position more and more and the output of the amplifier 34 increases to control the servo motor 35 in such a manner as to drive it more rapidly. As a result of this, the servo motor finally comes to be driven at an optimum speed in agreement with the differentiated value $\dot\theta$ of the angle $\theta$. In other words, proportional relationship is constituted between the rotational speed of the servo motor and the value $\dot\theta$ and between the output of the amplifier 34 and $\dot\theta$.

Therefore, the principles of this invention can be embodied merely by applying to the gyro about the horizontal shafts 7 and 7' through the torquer 17 and torque proportional to the output of the amplifier 34 which is, in turn, proportional to $\dot\theta$. In the example shown in FIG. 4, the output of the amplifier 34 is fed to a winding 43 wound on the central leg of the E-shaped core of the stator 17'', and windings 44 and 45 on the other two legs are energized by the A. C. power source 46. In such a case, if the rotor 17' takes the form of, for instance, a cylindrical metal conductor, the stator 17'' can apply to the rotor 17 a reversible torque proportional to the output voltage of the amplifier 34 by the principle of the two-phase motor.

Thus, when a torque proportional to $\dot\theta$ is applied to the gyro about the horizontal shafts 7 and 7', the instrument depicted in FIG. 2 should move toward and settle in a position pointing to the point P of FIG. 1 in accordance with the principles above described with FIG. 1. Further, since the elements disposed within the container 8' are free from error producing conditions by rolling and/or pitching of, for example, a ship due to degrees of the shafts 11, 11', 31 and 31', the above described purposes can be accomplished by the present invention instrument on the ship.

The rotor of the synchro generator 48, though not shown, is so arranged as to be rotated in proportion to the relative rotational angle between the shaft 7' and the case 32, so that, on the basis of the position of the rotor of the synchro generator 48 when the gyro-spin axis and the electrolyte level 33 are horizontal, the angle indicated by the synchro generator 48 when the gyro-spin axis has come to rest toward the point P in FIG. 1 is representative of the latitude itself. That is, the latitude can be always continuously indicated by a synchro receiver connected to the synchro generator 48. It is of course possible to replace the synchro device with a potentiometer of a two-speed synchro system.

The azimuth can readily be read out from the compass card 29 relative to the pointer 28. Further, even if the latitude varies with advancement of the ship after the point P has been once indicated, the angle $\theta$ is always representative of the latitude of the ship's location, and hence the absolute value of the ship's speed in the north-south direction can be obtained from the differentiated value $\dot\theta$ of the angle $\theta$.

The gyroscopic instrument of this invention adapted for simultaneous indication of latitude and azimuth can be provided with a repeater generator mechanism 64, a repeater, an alarm device, etc., in a similar manner to conventional types of gyro-compasses.

Figure 6:
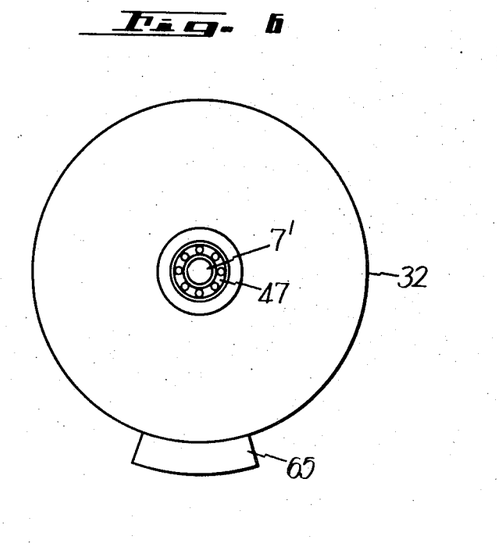
FIGS. 6 and 7 are side views schematically illustrating other examples of the gyro control device of this invention, FIG. 6 showing addition of a weight and, FIG. 7 showing a liquid system to be added to the elements contained in the control unit. DESCRIPTION OF THE PREFERRED EMBODIMENTS With reference to the drawings the present invention will be described in detail.

The $\theta$ detecting means depicted in FIG. 3 is a mere example thereof and it is needless to say that the electrolyte level 33 exemplified in the figure can be replaced by any of various accelerometers developed for use with the inertial navigation system. In case of using an accelerometer having a wide acceleration detecting range, it is directly secured to the vertical ring 6 without employing the servo system including the servo motor 35, by which an output is led out in proportion to the angle $\theta$ and the resulting output is differentiated by a known computer to provide $\dot\theta$. Although the method described with FIGS. 3 and 4 consists in the detection of $\theta$ by the use of the device 16 and in the application of a torque to the gyro through the torquer 17 in response to $\theta$, the reference to this method should not be construed as limiting this invention specifically thereto. In short, the purpose can be accomplished by the employment of any means capable of producing a torque about the horizontal shafts of the gyro in proportion to $\theta$. FIG. 6 illustrates another example of the method for serving the purpose, which employs the device 16 depicted in FIG. 3 and in which a weight 65 is mounted on the case 32. This is a method based upon the fact that the follow-up error of the servo system including the electrolyte level 33, the amplifier 34, the servo motor 35 and the gear trans 53, 59 and 54 is substantially proportional to $\theta$. The case 32 deviates from its neutral position in response to the follow-up error and the weight 65 shifts to right or left correspondingly to produce a restoring torque due to gravity acting upon the weight 65, which torque is substantially proportional to $\theta$. Accordingly, in this case the torquer 17 is unnecessary. In the case of the system of FIG. 6, the servo system from the electrolyte level 33 to the gear 54 must be designed to be high precision and provide a suitable follow-up error proportional to the speed of the servo motor.

Figure 7:
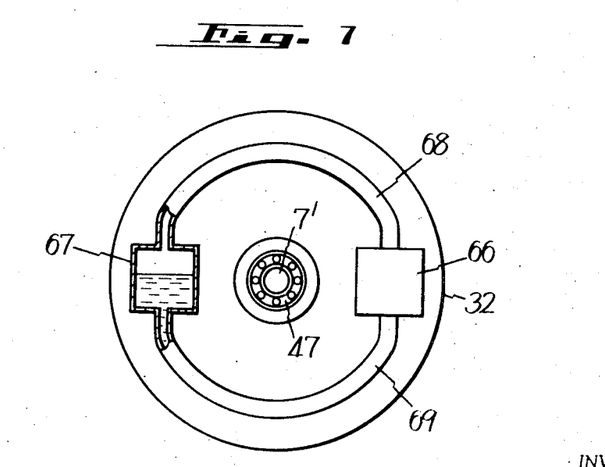

FIG. 7 illustrates still another example of the method for serving the above purposes which also utilizes substantial proportionality of the angular error of the servo system to $\theta$ and in which the interior construction of the case 32 is exactly the same as that of the case depicted in FIG. 3, except that the torquer 17 is replaced with two hollow containers 66 and 67 interconnected at upper and lower end faces thereof by an air pipe 68 and a communicating pipe 69. The containers 66 and 67 and the communicating pipe 69 enclose therein a liquid, for example, mercury in such an amount as to fill half the containers when the case 32 rests at its neutral position; when the bubble $\beta$ of the electrolyte level 33 lies at the center of its vessel. With such a device, when an angular error is produced in the servo system the liquid flows into a lower container from the elevated one, since the liquid levels in the two containers are always in the same horizontal plane in the field of gravity by the syphon principle. This yields a torque about the shafts 7 and 7' which tends to push down the lower container. The torque is in proportion to the servo error and the latter is, in turn, substantially proportional to $\theta$, so that the torque is naturally in proportion to $\theta$. The device exemplified in FIG. 7 is advantageous in that the torquer 17 is not required in that the containers 66 and 67 in case 32 serve its purpose and the torque can be substantially proportional to $\theta$ by increasing the cross-sectional area of the containers 66 and 67. In this example, however, since the torque is produced in an opposite direction to that in FIG. 6, it is necessary to reverse the direction of the vector H of the angular momentum of the gyro, that is, to rotate the gyro in a reverse direction.

As has been described in the foregoing, there are many means for detecting $\theta$, all of which can be employed in this invention so long as they are adapted to apply a torque to the gyro about its horizontal shafts substantially in proportion to $\theta$.

Similarly, in the example shown in FIG. 4 it is needless to say that the servo motor 35 and the torquer 17 may be respectively controlled by individual amplifiers without applying the same output of the single amplifier 34 to the servo motor 35 and the torquer 17.

Figure 5:
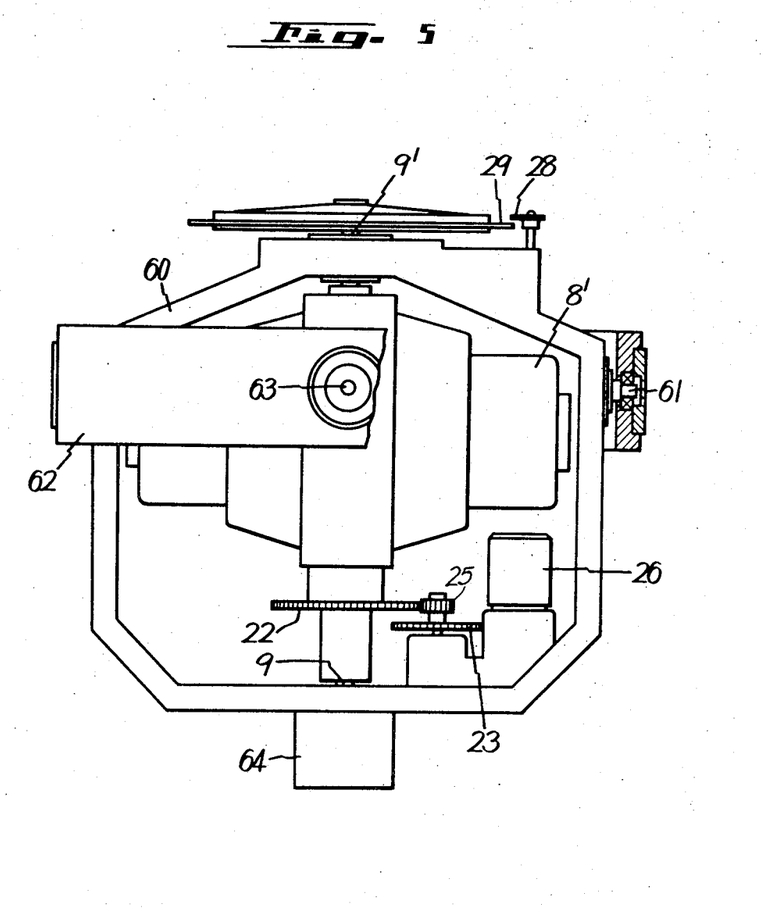
FIG. 5 is a side view schematically illustrating another example of the gyroscopic instrument of this invention, having one portion removed.

In FIG. 5 there is illustrated another example of the gyroscopic instrument which is quite different from that depicted in FIG. 2 in the construction of the support mechanism. That is, the container 8' is exactly the same in the interior construction as that of FIG. 2 but is supported in a quite different manner. In the example of FIG. 5 the container 8' has directly attached thereto follower shafts 9 and 9', which are, in turn, supported by a vertical outer ring 60 by means of bearings (not shown). The vertical outer ring 60 has gimbal shafts 61 and 61' (not shown) and these are supported by a gimbal ring 62 through bearings. In addition, the instrument is designed so that the center of total gravity of the components disposed within the vertical outer ring 60 lies under the shaft 61. The gimbal ring 62 is provided with horizontal gimbal shafts 63 and 63' (not shown) arranged at right angles to the gimbal shaft 61, and the shafts 63 and 63' are, in turn, supported by a binnacle (not shown). With such an arrangement, even if the binnacle inclines with a ship, the shafts 9 and 9' are held substantially vertical due to degrees of freedom of the shafts 61, 61', 63 and 63' and due t gravity and hence shafts 9 and 9' are not directly affected by the oscillatory motion of the ship.

A description will hereinbelow be made in connection with novel means for improving the performance of the gyroscopic instrument which forms one important part of this invention. As illustrated in FIG. 4 a rotor $17_1'$ and a stator $17_1''$, identical in construction with the aforementioned ones 17' and 17'', are mounted about the vertical shaft 5 or 5' in a manner to constitute a torquer $17_1$ and a circuit is additionally provided for energizing a control winding of the torquer $17_1$ similar to the winding 43 in proportion to the output of the amplifier 34. In this case the other elements of the gyroscopic instrument such as those of the device 16 and so on are exactly the same as the aforementioned ones of the instrument illustrated in FIG. 4. Providing that the point S stays on the right side of the line $f$ in FIG. 1 and the angle $\theta$ gradually increases, a torque is applied to the gyro about the vertical shaft 5 or 5' in proportion to its differentiated value $\dot\theta$, thereby to urge an increase in $\theta$. In other words, this method leads to shortening of the period of the gyro motion. Accordingly, by suitably selecting the proportionality constant of the torque applied to the gyro about its vertical shaft 5 or 5' substantially in proportion to $\dot\theta$, the point S located at any desired place in FIG. 1 can be brought to the point P more rapidly than in the case where the above means are not provided.

As is apparent from the foregoing, the present invention is to provide a gyroscopic instrument for use with airplanes, ships and the like which employs only one gyro but is capable of not only providing the reference of azimuth as a gyrocompass but also continuous detection and indication of the latitude corresponding to a place where the instrument is located.

It will be apparent that many modifications and variations may be effected without departing from the scope of the novel concepts of this invention.

I claim as my invention:

1. A gyroscopic instrument comprising:

a gyro case having incorporated therein a gyro:

a first means for supporting said gyro case in neutral equilibrium with three degrees of freedom, said first means having a horizontal shaft about which said gyro case is substantially inclined, said horizontal shaft extending substantially at right angles to a spin axis of said gyro;

a second means for establishing a mounting having an axis on said horizontal shaft inclined about the axis of said horizontal shaft in proportion to a differentiated value of inclination of the spin axis of said gyro from the horizontal plane; and a third means mounted on said second means for producing a torque about the axis of said horizontal shaft in proportion to the inclination angle of said mounting axis about said horizontal shaft axis, said torque being applied to said gyro through said horizontal shaft, said third means having a pair of containers spaced from each other in the direction of said mounting axis, a pipe interconnecting said pair of containers at their lower ends, and a liquid contained in one part of each of said pair of containers and in said pipe, and said containers mounted such that when the fluid in the containers is at the same level with respect to both containers no torque is produced but said torque is produced when the fluid in said containers is not at the same level, whereby the spin axis of said gyro precesses about an axis orthogonal to said spin axis and said horizontal axis with a period of not longer than about 24 hours with respect to the earth, said precession being damped in accordance with time lapse, and the spin axis settles in a position parallel to the axis of the earth.

2. A gyroscopic instrument as claimed in claim 1 further including a second pipe interconnecting said pair of containers at their upper ends.

3. A gyroscopic instrument comprising:

a gyro case having incorporated therein a gyro;

means for supporting said gyro case with three degrees of freedom including a vertical ring rotatably supporting said gyro case and a support case rotatably supporting said vertical ring on a horizontal axis;

means for producing a differentiated value of inclination of the spin axis of said gyro about a substantially horizontal axis across said spin axis and at right angles thereto;

means having a mounting connected to said value producing means and positioned thereby as to inclination about the horizontal shaft axis for generating a control torque and for applying said control torque to said gyro case about said substantially horizontal axis and said control torque being proportional to said differentiated value of inclination of said spin axis, wherein said means for generating a control torque comprises a pair of containers attached to said mounting and spaced from each other in a direction inclined about said horizontal axis at an angle proportional to said differentiated value of said a pipe interconnecting said pair of containers at their lower ends, and a liquid partially filling each of said pair of containers and in said pipe and said containers mounted such that when the fluid in the containers is at the same level with respect to both containers no torque is produced on said mounting but torque is applied to said mounting when the fluid in said containers is not at the same level.

4. A gyroscopic instrument as claimed in claim 3 including a second pipe interconnecting said pair of containers at their upper ends.

* * * * *